(12) United States Patent
Wright et al.

(10) Patent No.: US 12,031,628 B1
(45) Date of Patent: Jul. 9, 2024

(54) GEARBOXES FOR ELECTRIC VEHICLE DRIVETRAINS AND METHODS OF SHIFTING THEREOF

(71) Applicant: DIMAAG-AI, Inc., Fremont, CA (US)

(72) Inventors: Ian Wright, Woodside, CA (US); David Kieke, Carmine, TX (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 18/403,363

(22) Filed: Jan. 3, 2024

(51) Int. Cl.
  *F16H 61/30* (2006.01)
  *F16H 61/04* (2006.01)

(52) U.S. Cl.
  CPC ......... *F16H 61/30* (2013.01); *F16H 61/0403* (2013.01); *F16H 2061/0422* (2013.01); *F16H 2061/307* (2013.01)

(58) Field of Classification Search
  CPC ............. F16H 61/30; F16H 2200/0034; F16H 2200/0021; F16H 63/3023; F16H 2061/307
  See application file for complete search history.

(56) References Cited

U.S. PATENT DOCUMENTS

| 2,137,939 | A | * | 11/1938 | Eaton | ............... | F16H 61/30 |
| | | | | | | 192/3.57 |
| 3,298,483 | A | * | 1/1967 | McKenzie | ............ | F16H 61/30 |
| | | | | | | 192/85.01 |
| 7,069,800 | B2 | * | 7/2006 | Knecht | ............... | F16H 63/3023 |
| | | | | | | 74/335 |
| 9,951,850 | B2 | * | 4/2018 | Kramer | ................ | F16H 37/043 |
| 2021/0364085 | A1 | * | 11/2021 | Filippin | ............. | F16H 61/0276 |

FOREIGN PATENT DOCUMENTS

| DE | 3837777 A1 | * | 5/1990 |
| WO | WO-2023031863 A1 | * | 3/2023 |

* cited by examiner

*Primary Examiner* — Sherry L Estremsky
(74) *Attorney, Agent, or Firm* — Polygon IP, LLP

(57) ABSTRACT

Described herein is a gearbox for an electric vehicle drivetrain unit comprising a gearbox enclosure, a support rod, a first piston, a second piston, and various hydraulic fluid passages. The support rod extends into the gearbox enclosure and at least partially protrudes/extends into the first and second pistons. The first piston, second piston, and support rod are fluidically connected with the hydraulic fluid passages such that when the gearbox is in a neutral gear, pressurized hydraulic fluid forces the first piston and the second piston against the support rod. When the gearbox is in a first gear, pressurized hydraulic fluid forces the support rod against the gearbox enclosure either directly or through the first piston. When the gearbox is in a second gear, pressurized hydraulic fluid forces the support rod against the gearbox enclosure directly or through the second piston. Also described are electric vehicles and shifting methods.

20 Claims, 7 Drawing Sheets

GEARBOXES FOR ELECTRIC VEHICLE DRIVETRAINS AND METHODS OF SHIFTING THEREOF

BACKGROUND

Electric motors are used on electric vehicles for propulsion (i.e., to drive the wheel rotation) and to provide mechanical power to other systems (e.g., air conditioning compressor). Typically, electric vehicle drivetrains either couple wheels directly to the driveshaft of the electric motor or employ reduction gearboxes. When used, reduction gearboxes are mechanically coupled to both the electric motor and one or more wheels to translate the relatively high rotational speed of the electric motor to the relatively low rotational speed needed for driving wheels. Unlike internal combustion engines, many electric vehicle motors provide sufficient power over a wide range of rotational speeds for the desired vehicle operation (e.g., from the takeoff to maximum vehicle speeds). In other words, electric motors have broad torque curves, which eliminate the need for shifting in some applications. Accordingly, unlike internal combustion engine drivetrains, electric vehicle drivetrains typically do not include systems that shift between higher and lower translational gears.

Furthermore, in a direct-drive electric vehicle drivetrain, the electric motor is controlled to stop rotating when the vehicle is stopped. In order to operate other components of the electric vehicle, for example, air conditioning compressors, additional motors must be installed in the vehicle. In larger vehicles with larger power requirements for drive motors, accessory components may require a significantly smaller electric motor than the drive motor. In these vehicles, it may be desirable to install a smaller electric motor dedicated to the accessory that can operate when the larger drive motor is not operating. However, in compact electric vehicles, accessory power requirements may be larger relative to the power output of the drive motors. For example, a typical passenger electric vehicle drivetrain may be powered by one or more 100 kW electric motors. The power required to operate an air conditioning compressor may be 2 kW. It may not be efficient to operate the 100 KW electric motor to power the compressor when the vehicle is stationary and the motor would otherwise be stopped and not drawing current from the vehicle's battery. However, if a compact electric vehicle drivetrain is powered by two 25 KW electric motors, it may be desirable to divert some of the power from one of the motors to power the compressor. Compact vehicles may not have space to accommodate multiple motors in addition to those in the drivetrain. In these vehicles, it may be a challenge to power accessories from a drive motor when the vehicle is stopped.

When gearboxes with shiftable translation gears are used, one challenge may be to provide synchronization (based on the current gear ratios) between the motor speed and the wheel speed when shifting. In a typical internal combustion engine drivetrain (that has a significant rotational momentum limiting the acceleration/deceleration rates), synchronization rings in the gearbox match the rotation speed between the motor driveshaft with the wheel speed during shifting. This improves the meshing of the gears or shift dogs. In an electric vehicle drivetrain, it may be desirable instead to synchronize the motor speed to the wheel speed by changing the motor speed (while the gearbox is in neutral gear). This may take advantage of the rapid speed adjustments that are possible with electric motors (and generally not available on internal combustion engines). Exclusion of synchronization rings may decrease the weight of the gearbox. However, shifting from one drive gear to another drive gear without synchronizing the motor speed with the wheel speed may prevent engagement of the desired drive gear and may cause damage to the gearbox components and cause drivability issues (even though such systems are used on race vehicles and motorcycles).

It should be noted that electric motors are also lighter and occupy less space than internal combustion engines that provide similar power output. An internal combustion engine-powered vehicle typically has only one internal combustion engine. Mechanical systems transmit the power from the engine to two or four wheels (through various transfer cases and differentials). These mechanical systems also allow the transfer of power to wheels that may turn at different rates, for example, during cornering. Some of these power transfer systems can be also found on electric vehicle drivetrain. The size, ease of powering and control, and costs of electric motors allow for the use of multiple electric motors on the same vehicle (e.g., a dedicated electric motor for each axle/wheel). However, integrating the shiftable-gear features with multiple electric motors on the same vehicle (e.g., on the same axle) can be particularly challenging.

What is needed are new gearboxes for electric vehicle drivetrains and methods of shifting thereof.

SUMMARY

Described herein is a gearbox for an electric vehicle drivetrain unit comprising a gearbox enclosure, a support rod, a first piston, a second piston, and various hydraulic fluid passages. The support rod extends into the gearbox enclosure and at least partially protrudes/extends into the first and second pistons. The first piston, second piston, and support rod are fluidically connected with the hydraulic fluid passages such that when the gearbox is in neutral gear, pressurized hydraulic fluid forces the first piston and the second piston against the support rod. When the gearbox is in first gear, pressurized hydraulic fluid forces the support rod against the gearbox enclosure either directly or through the first piston. When the gearbox is in second gear, pressurized hydraulic fluid forces the support rod against the gearbox enclosure directly or through the second piston. Also described are electric vehicles and shifting methods.

Clause 1. A gearbox for an electric vehicle drivetrain unit, the gearbox comprising: a gearbox enclosure comprising a first-piston enclosure limiter, a second-piston enclosure limiter, a second neutral-gear passage, a first neutral-gear passage, a first-gear passage, and a second-gear passage; a support rod extending into the gearbox enclosure and fluidically coupled to at least the first-gear passage and the second-gear passage; a first piston positioned between and slidably isolating the second neutral-gear passage from at least a first portion of the support rod; and a second piston positioned between and slidably isolating the first neutral-gear passage from at least a second portion of the support rod, a shift-fork support positioned on and connected to the support rod, wherein: when the gearbox is in a neutral gear, a hydraulic fluid is configured to pressurize the second neutral-gear passage and the first neutral-gear passage forcing the first piston against the first-piston enclosure limiter and the support rod and also forcing the second piston against the second-piston enclosure limiter and the support rod, when the gearbox is in a first gear, the hydraulic fluid is configured to pressurize the first-gear passage and the first neutral-gear passage, forcing the support rod against the gearbox enclosure either directly or through the first piston and the second piston against the second-piston enclosure limiter, and when the gearbox is in a second gear, the hydraulic fluid is configured to pressurize the second-gear passage and the second neutral-gear passage forcing the support rod against the gearbox enclosure through the second piston and the first piston against the first-piston enclosure limiter.

Clause 2. The gearbox of clause 1, wherein when the gearbox is in the first gear, the hydraulic fluid is configured to pressurize the first-gear passage forcing the support rod against the gearbox enclosure through the first piston.

Clause 3. The gearbox of clause 1, wherein when the gearbox is in the second gear, the hydraulic fluid is configured to pressurize the second-gear passage forcing the support rod against the gearbox enclosure through the second piston.

Clause 4. The gearbox of clause 1, wherein the shift-fork support is positioned between the first piston and the second piston.

Clause 5. The gearbox of clause 1, wherein the support rod is positioned between and partially protruding the first piston and the second piston.

Clause 6. The gearbox of clause 1, wherein: the support rod comprises a support rod shaft and a support rod piston, positioned at an end of the support rod shaft and having a larger diameter than the support rod shaft, the support rod piston is positioned between the first piston and the second piston and slidably coupled to the gearbox enclosure, the support rod shaft protrudes through the first piston and is connected to the shift-fork support, and the shift-fork support is positioned at an opposite end of the support rod from the support rod piston.

Clause 7. The gearbox of clause 1, wherein: the support rod comprises a support rod shaft and a support rod piston positioned at an end of the support rod shaft and having a larger diameter than the support rod shaft, the gearbox enclosure comprises a rod-piston enclosure limiter, and when the gearbox is in the first gear, the hydraulic fluid is configured to pressurize the first-gear passage forcing the support rod piston against the rod-piston enclosure limiter.

Clause 8. The gearbox of clause 1, wherein when the gearbox is in the first gear, the hydraulic fluid is configured to pressurize the first-gear passage forcing the support rod against the gearbox enclosure.

Clause 9. The gearbox of clause 1, wherein: the support rod further comprises a first-piston limit shoulder, and when the gearbox is in the neutral gear, the hydraulic fluid is configured to pressurize the first neutral-gear passage forcing the first piston against the first-piston limit shoulder.

Clause 10. The gearbox of clause 1, further comprising a hydraulic tank, a hydraulic pump, a first neutral-gear valve, a second neutral-gear valve, a first-gear valve, and a second-gear valve, wherein: the hydraulic pump is fluidically coupled to the hydraulic tank, the first neutral-gear valve fluidically couples the second neutral-gear passage to the hydraulic pump in one operating position and to the hydraulic tank in another operating position, the second neutral-gear valve fluidically couples the first neutral-gear passage with the hydraulic pump in one operating position and with the hydraulic tank in another operating position, the first-gear valve fluidically couples first-gear passage with the hydraulic pump in one operating position and with the hydraulic tank in another operating position, and the second-gear valve fluidically couples the second-gear passage with the hydraulic pump in one operating position and with the hydraulic tank in another operating position.

Clause 11. The gearbox of clause 1, wherein the gearbox further comprises a set of axial springs positioned on the support rod such that one spring of the set of axial springs is positioned between the shift-fork support and the first piston and one spring of the set of axial springs is positioned between the shift-fork support and the second piston.

Clause 12. The gearbox of clause 1, further comprising a gear sensor comprising a first-gear switch, a neutral-gear switch, and a second-gear switch, wherein: the first-gear switch, the neutral-gear switch, and the second-gear switch each physically contact the shift-fork support; and the shift-fork support comprises a detent configured to activate the first-gear switch when the gearbox is in a first gear, activate the neutral-gear switch when the gearbox is in a neutral gear, and activate the second-gear switch when the gearbox is in a second gear.

Clause 13. An electric vehicle drivetrain unit comprising: an electric motor; a hydraulic tank and a hydraulic pump; a gearbox coupled to the motor; a wheel coupled to the gearbox, wherein: the gearbox comprises a gearbox enclosure and a support rod extending into the gearbox enclosure and fluidically coupled to a second neutral-gear passage, a first-gear passage, a second-gear passage, a first neutral-gear passage, a first-piston enclosure limiter, a second-piston enclosure limiter, a shift-fork support slidably coupled to the support rod, a first piston positioned between and slidably isolating first the neutral-gear passage from at least a first portion of the support rod, and a second piston positioned between and slidably isolating the first neutral-gear passage from at least a second portion of the support rod; when the gearbox is in a neutral gear, a hydraulic fluid is configured to pressurize the second neutral-gear passage and the first neutral-gear passage forcing the first piston against the first-piston enclosure limiter and the support rod and also forcing the second piston against the second-piston enclosure limiter and the support rod; when the gearbox is in a first gear, the hydraulic fluid is configured to pressurize the first-gear passage and the first neutral-gear passage, forcing the support rod against the gearbox enclosure either directly or through the first piston and the second piston against the second-piston enclosure limiter; and when the gearbox is in a second gear, the hydraulic fluid is configured to pressurize the second-gear passage and the second neutral-gear passage forcing the support rod against the gearbox enclosure either through the second piston and the first piston against the first-piston enclosure limiter.

Clause 14. The electric vehicle drivetrain unit of clause 13, further comprising a first neutral-gear valve, a second neutral-gear valve, a first-gear valve, a the second-gear valve, wherein: the hydraulic pump is fluidically coupled to the hydraulic tank; the first neutral-gear valve fluidically couples the second neutral-gear passage to the hydraulic pump in one operating position and to the hydraulic tank in another operating position; the second neutral-gear valve fluidically couples the first neutral-gear passage with the hydraulic pump in one operating position and with the hydraulic tank in another operating position; the first-gear valve fluidically couples first-gear passage with the hydraulic pump in one operating position and with the hydraulic tank in another operating position; and the second-gear valve fluidically couples the second-gear passage with the hydraulic pump in one operating position and with the hydraulic tank in another operating position.

Clause 15. The electric vehicle drivetrain unit of clause 14, further comprising a drivetrain controller, and a gear sensor comprising a first-gear switch, a neutral-gear switch, and a second-gear switch, wherein: the first-gear switch, the neutral-gear switch, and the second-gear switch are each communicatively coupled with the drivetrain controller; and the shift-fork support comprises a detent configured to activate the first-gear switch when the gearbox is in the first gear, activate the neutral-gear switch when the gearbox is in the neutral gear, and activate the second-gear switch when the gearbox is in the second gear.

Clause 16. The electric vehicle drivetrain unit of clause 15, wherein the drivetrain controller is communicatively coupled with and configured to change operating positions of the first neutral-gear valve, the second neutral-gear valve, the first-gear valve, and the second-gear valve.

Clause 17. The electric vehicle drivetrain unit of clause 13, further comprising an auxiliary unit output coupled to the electric motor configured to rotate when the electric motor rotates.

Clause 18. The electric vehicle drivetrain unit of clause 13, further comprising a drivetrain controller, an additional electric motor, an additional gearbox, and an additional wheel, wherein: the additional electric motor is mechanically coupled to the additional gearbox, the additional wheel is mechanically coupled to the additional gearbox; the additional electric motor and the additional gearbox are communicatively coupled to the drivetrain controller; and the additional gearbox is fluidically coupled to the hydraulic pump and the hydraulic tank and comprises a first neutral-gear valve, a second neutral-gear valve, a first-gear valve, and a second-gear valve.

Clause 19. The electric vehicle drivetrain unit of clause 18 wherein the drivetrain controller is configured to operate the valves of the additional gearbox in unison with the valves of the gearbox.

Clause 20. The electric vehicle drivetrain unit of clause 18 wherein the drivetrain controller is configured to operate the valves of the additional gearbox separately from the valves of the gearbox.

Clause 21. The electric vehicle drivetrain unit of clause 18 wherein the drivetrain controller is configured to operate the electric motor and the additional electric motor at different speeds.

Clause 22. A method of shifting gears in an electric vehicle comprising a gearbox and a drivetrain controller, the method comprising: providing the gearbox comprising a gear position sensor, a first neutral-gear valve, a second neutral-gear valve, a first-gear valve, a second-gear valve, a drivetrain controller communicatively connected with the gear position sensor and the valves, a gearbox enclosure comprising a first-piston enclosure limiter, a second-piston enclosure limiter, a second neutral-gear passage, a first neutral-gear passage, a first-gear passage, a second-gear passage, a support rod extending into the gearbox enclosure and fluidically coupled to at least the first-gear passage and the second-gear passage, a first piston positioned between and slidably isolating the second neutral-gear passage from at least a first portion of the support rod, and a second piston positioned between and slidably isolating the first neutral-gear passage from at least a second portion of the support rod comprising a first neutral-gear valve, a second neutral-gear valve, a first-gear valve, and a second-gear valve; detecting by the gear position sensor a current gear input; receiving at the drivetrain controller a current gear input; receiving at the drivetrain controller a gear input; comparing by the drivetrain controller the current gear input and the gear input; determining by the drivetrain controller a new valve configuration if the current gear input and the gear input are different; activating by the drivetrain controller the first neutral-gear valve, the second neutral-gear valve, the first-gear valve, and the second-gear valve such that the valves are configured to the new valve configuration if the current gear input and gear input are different, wherein: when the gearbox is in a neutral gear, a hydraulic fluid is configured to pressurize the second neutral-gear passage and the first neutral-gear passage forcing the first piston against the first-piston enclosure limiter and the support rod and also forcing the second piston against the second-piston enclosure limiter and the support rod, when the gearbox is in a first gear, the hydraulic fluid is configured to pressurize the first-gear passage and the first neutral-gear passage, forcing the support rod against the gearbox enclosure either directly or through the first piston and the second piston against the second-piston enclosure limiter, and when the gearbox is in a second gear, the hydraulic fluid is configured to pressurize the second-gear passage and the second neutral-gear passage forcing the support rod against the gearbox enclosure through the second piston and the first piston against the first-piston enclosure limiter.

Clause 23. The method of clause 22, wherein the electric vehicle further comprises a wheel speed sensor and a motor speed sensor communicatively connected with the drivetrain controller, further comprising: receiving at the drivetrain controller a wheel speed input from the wheel speed sensor; receiving at the drivetrain controller a motor speed input from the motor speed sensor; and determining at the drivetrain controller a difference between the wheel speed input and the motor speed input.

Clause 24. The method of clause 23, wherein the drivetrain controller activates the first neutral-gear valve, the second neutral-gear valve, the first-gear valve, and the second-gear valve such that the valves are configured to the valve configuration such that the gearbox is shifted to the neutral gear and then activating the valves such that the valves are configured to the new valve configuration if the current gear input is the first gear and the gear input is the second gear or if the current gear input is the second gear and the gear input is the first gear.

Clause 25. The method of clause 24, wherein: when the gearbox is in the neutral gear, the drivetrain controller instructs an electric motor to spin at a new speed if the difference between the wheel speed input and the motor speed input is greater than a first-speed difference limit; and activating, using the drivetrain controller, at least one of the first neutral-gear valve, the second neutral-gear valve, the first-gear valve, and the second-gear valve in accordance with a new valve configuration.

Clause 26. The method of clause 23, wherein the drivetrain controller activates the first neutral-gear valve, the second neutral-gear valve, the first-gear valve, and the second-gear valve such that the valves are configured to the valve configuration such that the gearbox is shifted from the first gear to the second gear or from the second gear to the first gear if the difference between the motor speed input and the wheel speed input is less than a second-speed difference limit.

DETAILED DESCRIPTION

Figure 1A:
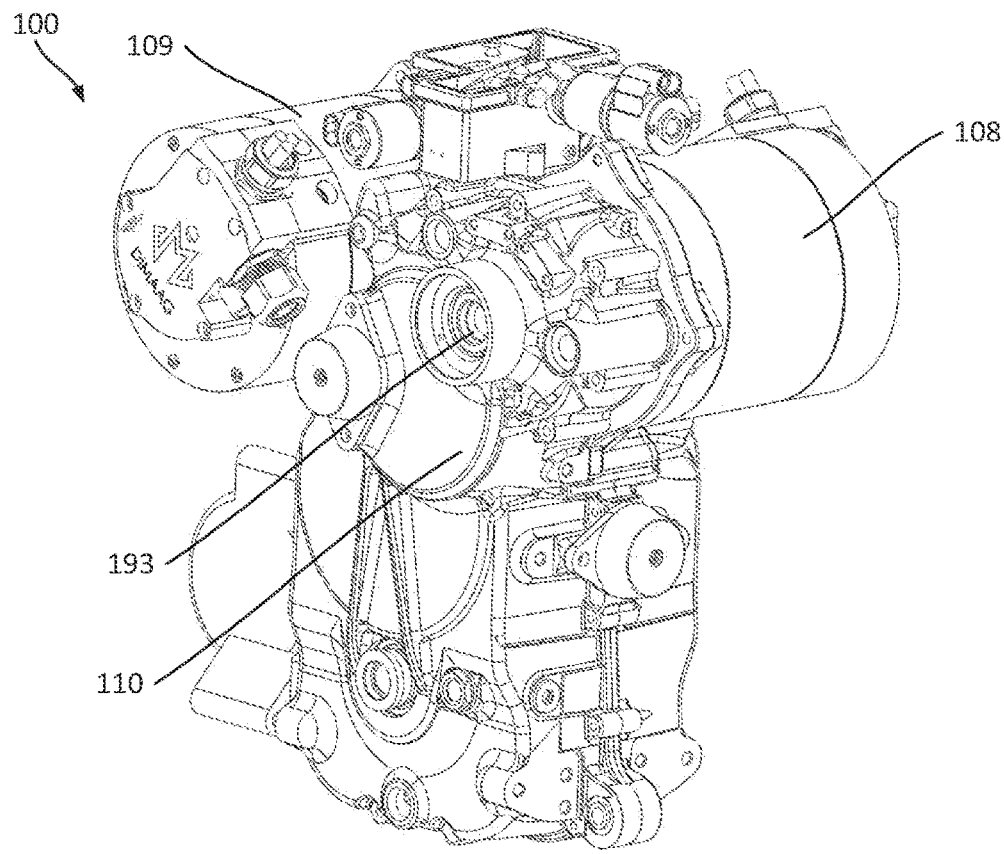
FIG. 1A is a perspective view of an electric vehicle drivetrain unit illustrating some components such as two electric motors, a gearbox system integrating two gearboxes (one for each motor), and an auxiliary unit output, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

INTRODUCTION

As noted above, electric vehicles can have a constant (non-shiftable) drivetrain linkage (gearing) of an electric motor to a wheel directly or through reduction gears. In this configuration, stopping the rotation of the wheel is achieved by stopping the rotation of the motor. The wheel speed is directly controlled by the motor speed. This constant (non-shiftable) drivetrain linkage does not provide for any power output (e.g., operation of other non-wheel attachments to the drivetrain system) when the vehicle is stopped (since the motor is also stopped and does not rotate). For example, accessories could also be powered by the same electric motor, such as an air conditioning compressor or a pump. The inclusion of a shiftable gearbox in the coupling between the electric motor and the wheel can provide a neutral gear in which the motor is operated but the wheel does not rotate. The shiftable gearbox can also provide multiple translational gears to vary the relative rotation of the electric motor and the wheel, which may be particularly useful for offroad use (e.g., all-terrain vehicles, tractors, and the like).

While powering two or four wheels on a vehicle with the same electric motor is common (e.g., using differentials), powering each wheel using a separate electric motor is highly desirable to achieve desired wheel speeds and traction. Specifically, the speed of each electric motor and, therefore, the speed of each wheel can be controlled independently. However, limited space in some compact vehicles may make providing a separate gearbox to couple each electric motor to one wheel difficult. Yet, shiftable gearboxes are highly desirable for many applications.

For example, one gear (e.g., a motor-side dog-clutch half) is coupled to the motor, while another gear (e.g., a wheel-side dog-clutch half) is coupled to the wheel. When these gears/dog-clutch halves are rotated at different speeds during the shifting of the gearbox, negative outcomes can happen when the two gears are engaged (e.g., by a shift dog or a translation gear). For example, damage to one or both gears, the motor, or other components can result. Furthermore, dangerous driving conditions, such as bucking and spinning of wheels, can result when the wheel is made to rapidly change speeds.

In some transmission configurations (used on internal combustion engines), this mismatch in speed is addressed by synchronization rings. However, the addition of synchronization rings can significantly increase the size of the gearbox and is generally not suitable for electric motors. Specifically, internal combustion engines with shiftable gearboxes also use clutches. As such, it's not the rotating mass of the crankshaft and flywheel that has to be synchronized but the mass of the clutch plate. The synchro rings (clutches) are designed to provide such acceleration. In some examples, electric vehicles (using electric motors) do not use clutches. Such electric vehicle drivetrain units may be referred to as clutchless drivetrain units. In such clutchless drivetrain units, the rotor mass (which is usually a lot greater than a clutch plate) needs to be synchronized, and such high-mass speed synchronization cannot be achieved with conventional synchro rings. In other examples, an electric vehicle drivetrain unit comprises a clutch, e.g., a friction clutch, such as a dry clutch and a wet clutch. The clutch may interconnect the electric motor and the gearbox.

In the electric vehicle drivetrain described herein, the motor speed is changed to achieve the necessary level of synchronization between the gears/dog-clutch halves. Specifically, the rotational speed of electric motors can be quickly varied by changing the electrical energy supplied thereby changing the rotational speed of the motor-side dog-clutch half. As described in detail below, the gearbox may be shifted from a drive gear (e.g., a first gear or a second gear) to a neutral gear. The motor speed can then be changed as needed (e.g., to achieve the desired relative speeds between the two gears/dog-clutch halves) before the gearbox is shifted to another drive gear. This may provide an opportunity for smooth meshing of the gears. Also, components of the gearbox may be designed to prevent overshoot in which the gearbox is shifted beyond a neutral gear configuration. This can prevent undesired shifting of the gearbox into a drive gear before the electric motor speed is synchronized.

Figure 1B:
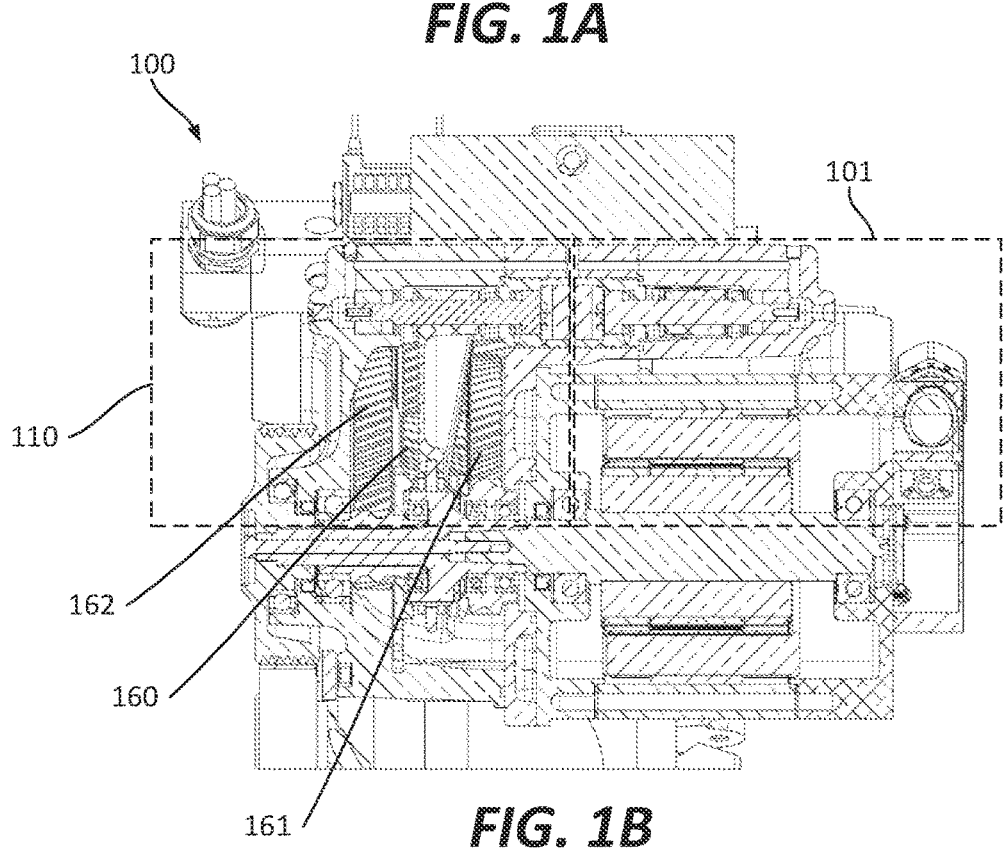
FIG. 1B cross-section view of a portion of the electric vehicle drivetrain unit of FIG. 1A illustrating some internal components of the drivetrain unit including a gearbox and an additional gearbox, in accordance with some examples.
Figure 1C:
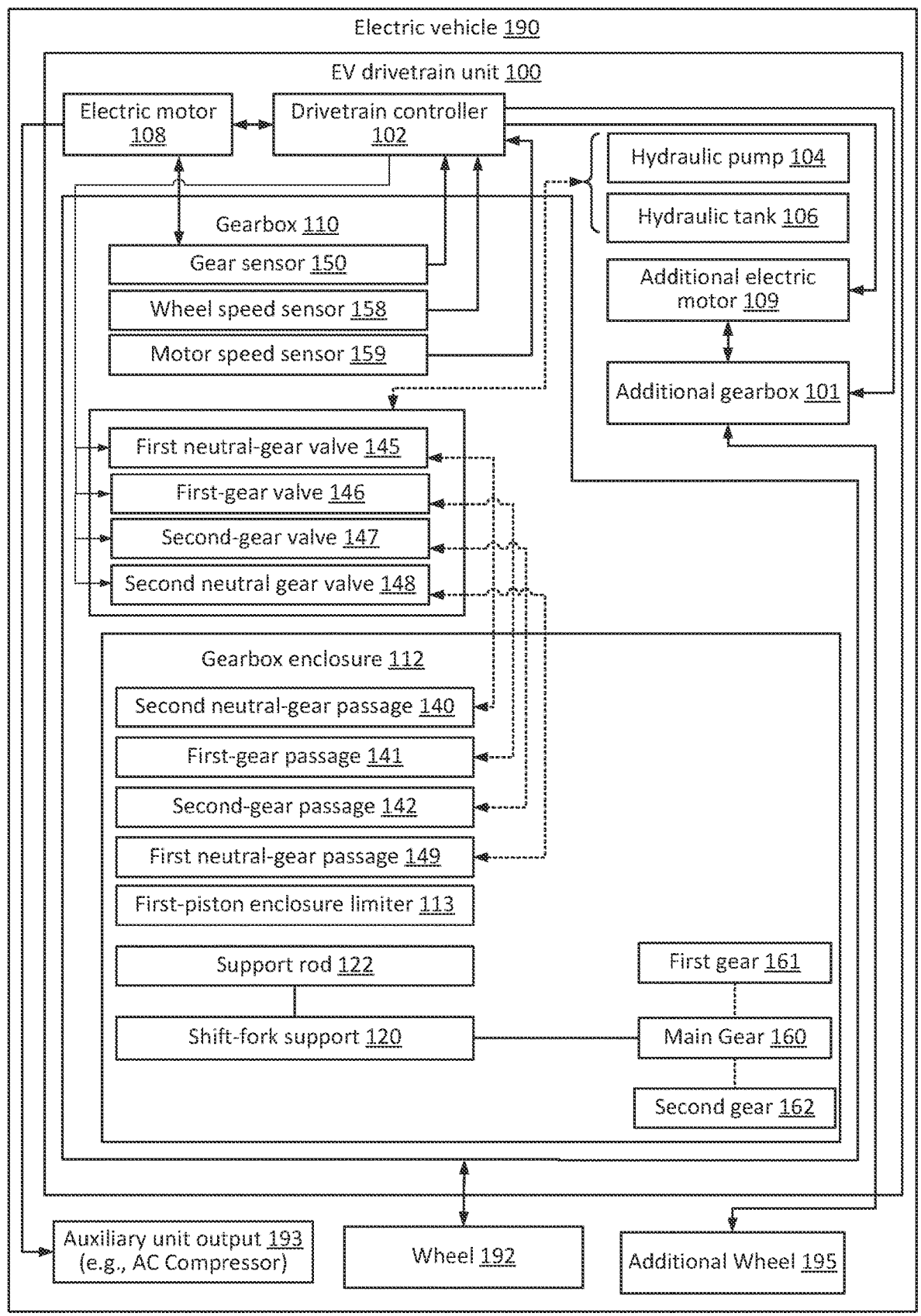
FIG. 1C is a is a block diagram of an electric vehicle comprising an electric vehicle drivetrain unit showing some relationships among the drivetrain unit's components, in accordance with some examples.

Described herein are compact, hydraulically operated gearboxes for electric vehicle drivetrains and methods of operating thereof. FIG. 1A is a perspective view of an electric vehicle drivetrain unit 100, in accordance with some examples. FIG. 1B is a cross-section view of the electric vehicle drivetrain unit 100 showing the relationship of some components, in accordance with some examples. FIG. 1C is a block diagram of some electric vehicles incorporating the electric vehicle drivetrain unit 100 showing some relationships of some components of the electric vehicle drivetrain unit 100, in accordance with some examples. Shown are an electric motor 108, an additional electric motor 109, and an auxiliary unit output 193. Highlighted by dashed line boxes in FIG. 1B are a gearbox 110 and an additional gearbox 101. The gearbox 110 and the auxiliary unit output 193 are mechanically coupled with the electric motor 108. For example, the electric motor 108 may be coupled to the main gear 160. A wheel 192 is mechanically coupled with the gearbox 110 or, more specifically, to the first gear 161 and the second gear 162 of the gearbox 110. The main gear 160 is configured to engage (1) the first gear 161 (when the "first gear" is selected), (2) the second gear 162 of the gearbox 110 (when the "second gear" is selected, or (3) not engaged either the first gear 161 or the second gear 162 of the gearbox 110 (when the "neutral gear" is selected).

In some examples, the additional gearbox 101 is mechanically coupled with the additional electric motor 109. An additional wheel 195 is mechanically coupled with the additional gearbox 101. Not shown in the views in FIG. 1A or 1B, the electric vehicle drivetrain unit 100 further comprises a drivetrain controller 102, a hydraulic pump 104, and a hydraulic tank 106. The drivetrain controller 102 is communicatively coupled with the electric motor 108 and the additional electric motor 109. The hydraulic pump 104 and the hydraulic tank 106 are fluidically coupled to valves as shown schematically in FIG. 1A. The relationships of the valves, the hydraulic pump 104, the hydraulic tank 106, and other components of the electric vehicle drivetrain unit 100 will be described in more detail below Examples of Gearboxes for Electric Vehicle Drivetrain Units FIG. 2B is a schematic cross-section view that illustrates the relationship of some components of the gearbox 110. The gearbox 110 comprises a gearbox enclosure 112. The gearbox enclosure 112 comprises a first-piston enclosure limiter 113, a second-piston enclosure limiter 114, a first neutral-gear passage 149, a second neutral-gear passage 140, a support rod 122, a first-gear passage 141, and a second-gear passage 142. The support rod 122 extends into the gearbox enclosure 112 and is fluidically coupled to at least the first-gear passage 141 and the second-gear passage 142. A first piston 131 is positioned between and slidably isolates the second neutral-gear passage 140 from at least a first portion of the support rod 122. A second piston 132 is positioned between and slidably isolates the first neutral-gear passage 149 from at least a second portion of the support rod 122. Shift-fork support 120 is positioned on and connected to the support rod 122. For example, the shift-fork support 120 may be slidably affixed to the support rod 122 (e.g., using a set of axial springs 125 as further described below with reference to FIGS. 3A-3C).

When the gearbox 110 is in a neutral gear, as illustrated in FIG. 2B, a hydraulic fluid is configured to pressurize the first neutral-gear passage 149 and the second neutral-gear passage 140. The hydraulic fluid pressurizing the second neutral-gear passage 140 forces the first piston 131 against the first-piston enclosure limiter 113 and the support rod 122. The hydraulic fluid pressurizing the first neutral-gear passage 149 forces the second piston 132 against the second-piston enclosure limiter 114 and the support rod 122.

Figure 2A:
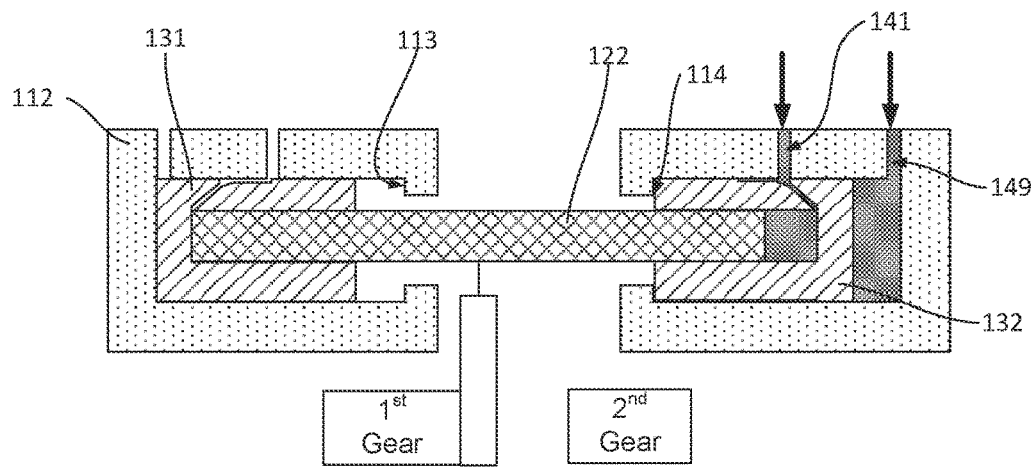
FIG. 2A is a schematic cross-section view of a gearbox in a first gear illustrating the relationship between some components, in accordance with some examples.
Figure 2B:
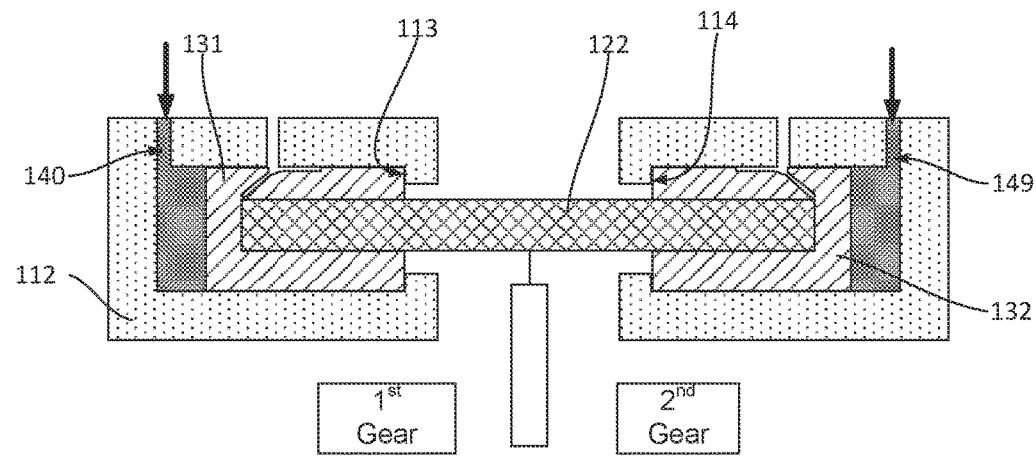
FIG. 2B is a schematic cross-section view of a gearbox in a neutral gear illustrating the relationship between some components, in accordance with some examples.
Figure 2C:
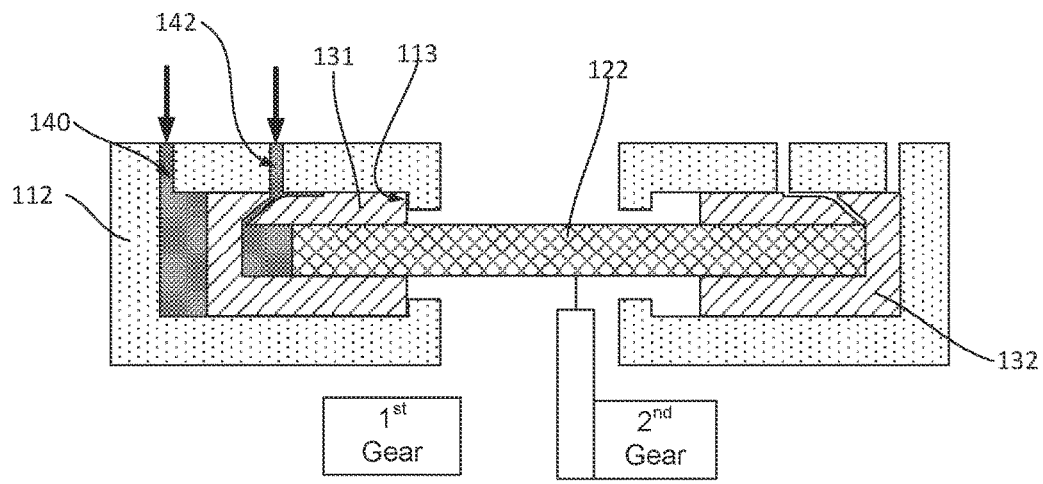
FIG. 2C is a schematic cross-section view of a gearbox in a second gear illustrating the relationship between some components, in accordance with some examples.

FIG. 2A and FIG. 2C are schematic cross-section views showing relationships between the same components when the gearbox 110 is in other operating modes. As illustrated in FIG. 2A, when the gearbox 110 is in a first gear, the hydraulic fluid is configured to pressurize the first-gear passage 141 and the first neutral-gear passage 149. The hydraulic fluid forces the support rod 122 against the gearbox enclosure 112 through the first piston 131 and the second piston 132 against the second-piston enclosure limiter 114. As illustrated in FIG. 2C, when the gearbox 110 is in a second gear, the hydraulic fluid is configured to pressurize the second-gear passage 142 and the second neutral-gear passage 140. The hydraulic fluid forces the support rod 122 against the gearbox enclosure 112 through the second piston 132 and the first piston 131 against the first-piston enclosure limiter 113.

In some examples, when the gearbox 110 is in the first gear, the hydraulic fluid is configured to pressurize the first-gear passage 141 forcing the support rod 122 against the gearbox enclosure through the first piston 131. In some examples, when the gearbox 110 is in the second gear, the hydraulic fluid is configured to pressurize the second-gear passage 142 forcing the support rod 122 against the gearbox enclosure 112 through the second piston 132. In some examples, the support rod 122 is positioned between and partially protruding the first piston 131 and the second piston 132. In some examples, the shift-fork support 120 is positioned along the support rod 122 and between the first piston 131 and the second piston 132.

Referring again to FIG. 1C, the gearbox 110 comprises a first neutral-gear valve 145, a second neutral-gear valve 148, a first-gear valve 146, and a second-gear valve 147. These valves are communicatively coupled with the drivetrain controller 102. In some examples, these valves operate as three-way valves with two operating positions. The hydraulic pump 104 is fluidically coupled to the hydraulic tank 106. More specifically, the hydraulic tank 106 is coupled to the low-pressure side or inlet side of the hydraulic pump 104. The hydraulic tank 106 is a reservoir for the hydraulic fluid of the gearbox 110. The first neutral-gear valve 145 fluidically couples the second neutral-gear passage 140 to the hydraulic pump 104 in one operating position and to the hydraulic tank 106 in another operating position. The second neutral-gear valve 148 fluidically couples the first neutral-gear passage 149 with the hydraulic pump 104 in one operating position and with the hydraulic tank 106 in another operating position. The first-gear valve 146 fluidically couples first-gear passage 141 with the hydraulic pump 104 in one operating position and with the hydraulic tank 106 in another operating position. The second-gear valve 147 fluidically couples the second-gear passage 142 with the hydraulic pump 104 in one operating position and with the hydraulic tank 106 in another operating position. When a component of the gearbox 110 is fluidically coupled with the hydraulic pump 104, it is pressurized.

In some examples, the gearbox 110 comprises a set of axial springs 125 positioned on the support rod 122. One spring of the set of axial springs 125 is positioned between the shift-fork support 120 and the first piston 131 and one spring of the set of axial springs 125 is positioned between the shift-fork support 120 and the second piston 132. The set of axial springs 125 is configured to provide resistance between the shift-fork support 120 approaches the gearbox enclosure 112 when the gearbox 110 is shifted from the neutral gear into the first gear or the second gear. The resistance provided by the set of axial springs 125 allows a gear connected to the shift-fork support 120 to mesh with either the first gear or second gear in cases where the gears meet with tooth-to-tooth contact.

Figure 1D:
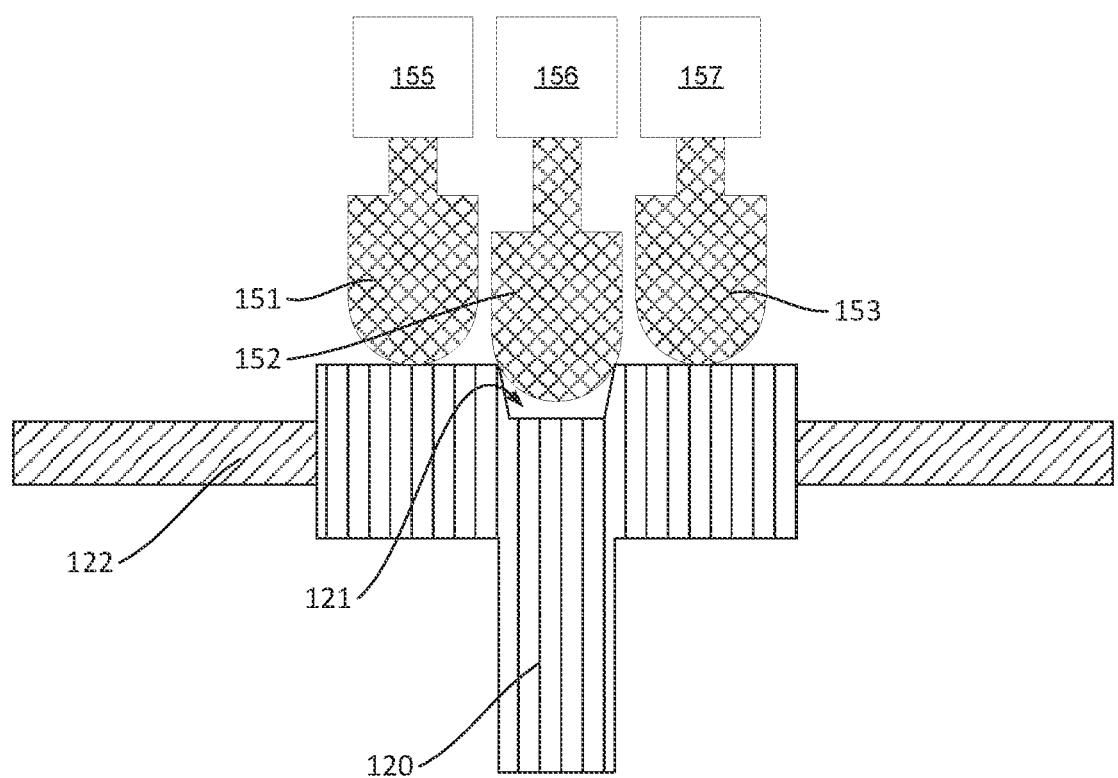
FIG. 1D is a schematic cross-section view of a gear sensor in FIG. 1C, illustrating the actuation of a sensor switch by the shift-fork support, in accordance with some examples.

In some examples, the gearbox 110 comprises a gear sensor 150. The gear sensor 150 comprises a first-gear switch 157, a neutral-gear switch 156, and a second-gear switch 155. The first-gear switch 157, the neutral-gear switch 156, and the second-gear switch 155 are actuated by physical displacement and are positioned such that they physically contact the shift-fork support 120. Each of the first-gear switch 157, the neutral-gear switch 156, and the second-gear switch 155 is communicatively coupled with the drivetrain controller 102. The shift-fork support 120 comprises a detent 121 configured to actuate the first-gear switch 157 (e.g., using a first-gear switch arm 151) when the gearbox 110 is in the first gear. Similarly, the detent 121 is configured to actuate the neutral-gear switch 156 (e.g., using the neutral-gear switch arm 152) when the gearbox 110 is in the neutral gear shown in FIG. 1D. For example, when the gearbox 110 shifts from the first gear to the neutral gear, the shift-fork support 120 (and the detent 121) moves to the left (with reference to FIG. 1D), such that the first-gear switch arm 151 is no longer aligned with the detent 121 and is pushed up (e.g., triggering/turning off the first-gear switch 157), while the neutral-gear switch arm 152 becomes aligned with the detent 121 and moves down (into the detent 121, e.g., triggering/turning on the neutral-gear switch 156). Finally, the detent 121 is configured to actuate the second-gear switch 155 (e.g., using a second-gear switch arm 153) when the gearbox 110 is in the second gear. In some examples, the three switches are oil submersible.

Figure 2D:
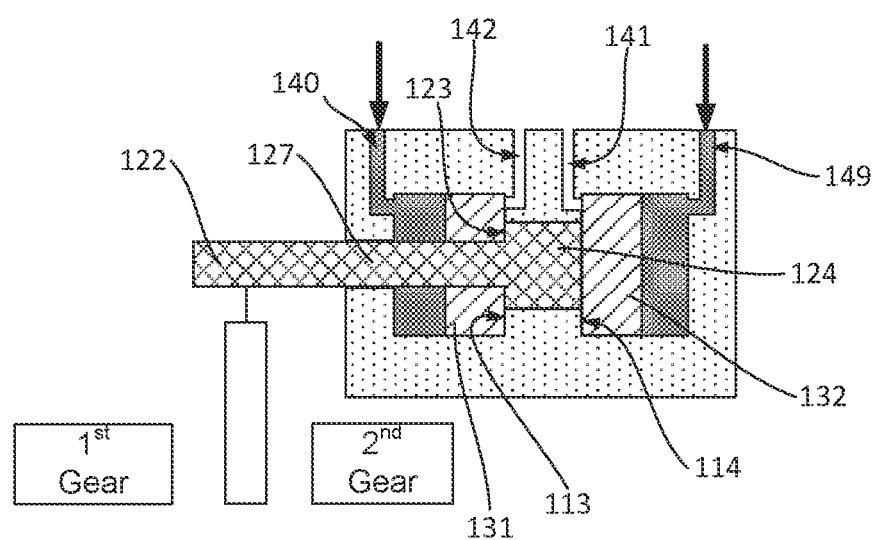
FIG. 2D is a schematic cross-section view of a gearbox in a neutral gear illustrating an additional arrangement of various components of the gearbox, in accordance with some examples.

FIG. 2D is a schematic cross-section view illustrating the relationship of some components of the gearbox 110, in accordance with some examples. The support rod 122 comprises a support rod shaft 127 and a support rod piston 124. The support rod piston 124 is positioned at the end of the support rod shaft 127 and has a larger diameter than the support rod shaft 127. The support rod piston 124 is positioned between the first piston 131 and the second piston 132 and slidably coupled to the gearbox enclosure 112. The support rod shaft 127 protrudes through the first piston 131 and is connected to the shift-fork support 120. The shift-fork support 120 is positioned at the opposite end of the support rod 122 from the support rod piston 124.

Figure 3A:
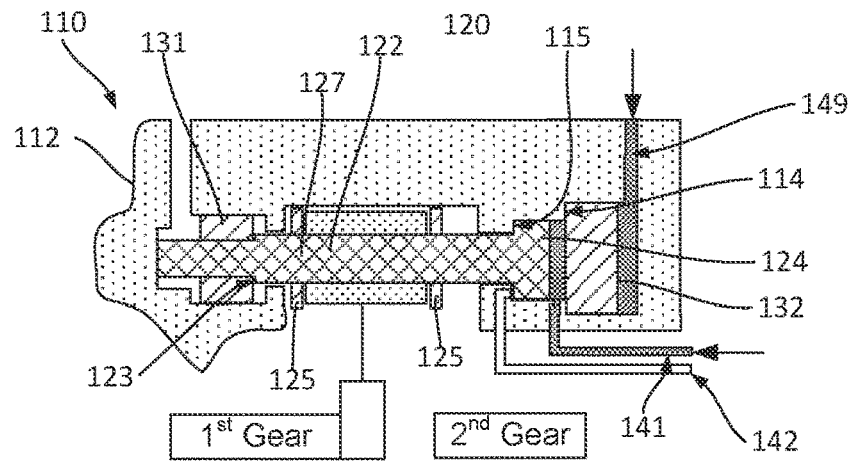
FIG. 3A is a schematic cross-section view of a gearbox in a first gear illustrating the relationship between some components, in accordance with some examples.
Figure 3B:
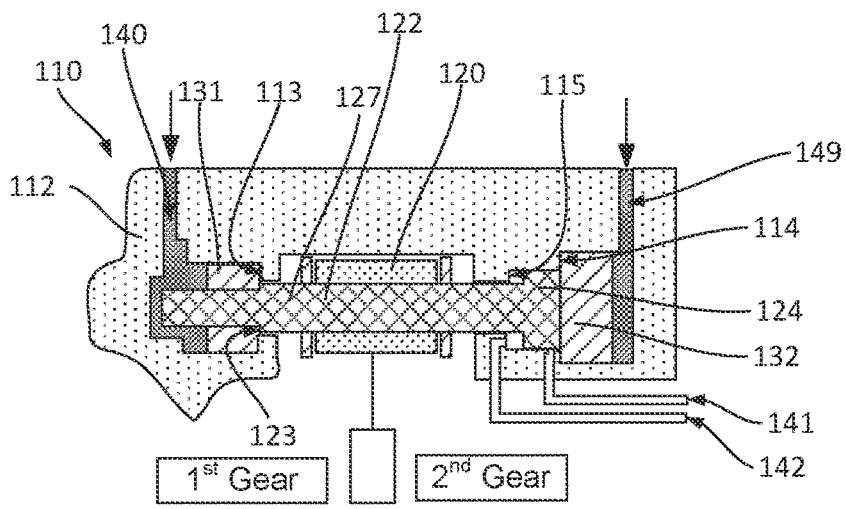
FIG. 3B is a schematic cross-section view of a gearbox in a neutral gear illustrating the relationship between some components, in accordance with some examples.
Figure 3C:
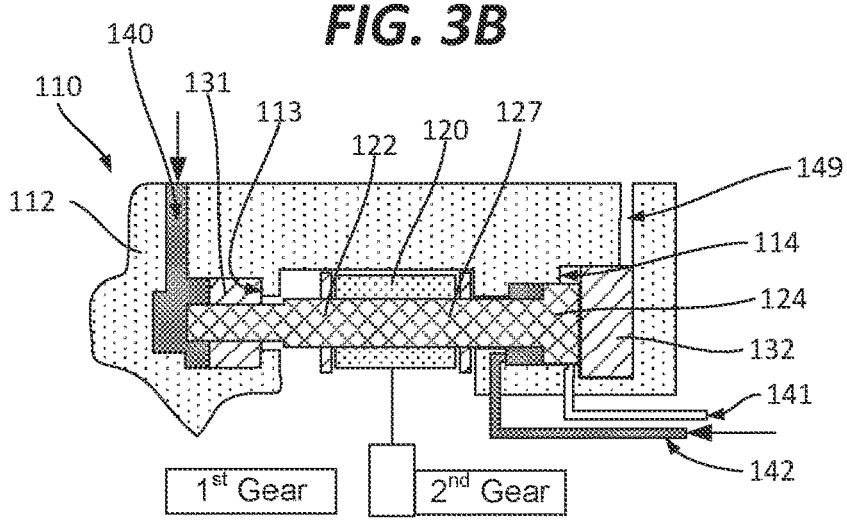
FIG. 3C is a schematic cross-section view of a gearbox in a second gear illustrating the relationship between some components, in accordance with some examples.

FIG. 3B is a schematic cross-section view of another example of the gearbox 110. In this example, the support rod 122 comprises a support rod shaft 127 and a support rod piston 124 positioned at the end of the support rod shaft 127 and having a larger diameter than the support rod shaft 127, as described above. The support rod piston 124 is positioned between the first piston 131 and the second piston 132. The support rod shaft 127 comprises a first-piston limit shoulder 123 at the opposite end of the support rod piston 124 from the support rod shaft 127. The support-rod shaft 127 decreases in diameter at the first-piston limit shoulder 123. When the gearbox 110 is in the neutral gear, the hydraulic fluid is configured to pressurize the first neutral-gear passage 149 and the second neutral-gear passage 140. The hydraulic fluid pressurizing the first neutral-gear passage 149 forces the second piston 132 against the support rod piston 124. The hydraulic fluid pressurizing the second neutral-gear passage 140 forces the first piston 131 against the first-piston limit shoulder 123 and against the first-piston enclosure limiter 113. It also forces the support rod piston 124 against the second piston 132. This forces the shift-fork support 120 into the neutral gear position. The gearbox enclosure 112 further comprises a rod-piston enclosure limiter 115. When the gearbox 110 is in the first gear, as illustrated in FIG. 3A, the hydraulic fluid is configured to pressurize the first neutral-gear passage 149 and the first-gear passage 141. The hydraulic fluid pressurizing the first-gear passage 141 forces the support-rod piston 124 against the rod-piston enclosure limiter 115. The hydraulic fluid pressurizing the first neutral-gear passage 149 forces the second piston 132 against the second-piston enclosure limiter 114. This forces the shift-fork support 120 into the first gear position. This forces the shift-fork support 120 into the first gear position. When the gearbox 110 is in the second gear, as illustrated in FIG. 3C, the hydraulic fluid is configured to pressurize the second neutral-gear passage 140 and the second-gear passage 142. The hydraulic fluid pressurizing the second neutral-gear passage 140 forces the first piston 131 against the first piston enclosure limiter 113. The second-gear passage 142 forces the support-rod piston 124 against the second piston 132. This forces the shift-fork support 120 into the second gear position.

In some examples, when the gearbox 110 is in the first gear, the hydraulic fluid is configured to pressurize the first-gear passage 141 forcing the support rod 122 directly against the gearbox enclosure 112.

In some examples, the surface area of components of the gearbox 110 that are acted upon by pressurized hydraulic fluid may differ. Sliding of some components more rapidly than others during shifting may result in undesirable overshoot. Overshoot means components of the gearbox 110 slide further than necessary. Overshoot may lead to damage of some components of the gearbox 110 and may cause undesirable drivability of the electric vehicle 190. For example, the surface area of the surface of the first piston 131 exposed to hydraulic fluid when the second neutral-gear passage 140 is larger than the surface area of the surface of the support rod 122 exposed to hydraulic fluid when the second-gear passage 142 is pressurized. If both the second neutral-gear passage 140 and the second-gear passage 142 are pressurized to the same pressure, the hydraulic force acting on the first piston 131 will be greater than the hydraulic force acting on the support rod 122. By maintaining hydraulic pressure in the first neutral-gear passage 149 while the second neutral-gear passage 140 is pressurized, the second piston 132 may remain forced against the second piston-enclosure limiter. The second piston 132 then prevents the support rod 122 from overshooting the neutral gear position and shifting directly from the first gear to the second gear.

Examples of Electric Vehicles

Gearboxes described herein can be used in electric vehicles. FIG. 1C is a block diagram of an electric vehicle 190 in accordance with some examples. The electric vehicle 190 comprises an electric vehicle drivetrain unit 100. The electric vehicle drivetrain unit 100 comprises an electric motor 108, a hydraulic tank 106 and a hydraulic pump 104, a gearbox 110 coupled to the motor 108, and a wheel 192 coupled to the gearbox 110. The gearbox 110 comprises a support rod 122 extending into the gearbox enclosure 112. The support rod 122 is fluidically coupled to a second neutral-gear passage 140, a first-gear passage 141, a second-gear passage 142, a first neutral-gear passage 149, a shift-fork support 120, a first piston 131, a second piston 132, first-piston enclosure limiter 113, and a second-piston enclosure limiter 114. The shift-fork support 120 is slidably coupled to the support rod 122. The first piston 131 is positioned between and slidably isolating the second neutral-gear passage 140 from at least a portion of the support rod 122. The second piston 132 is positioned between and slidably isolating the first neutral-gear passage 149 from at least a second portion of the support rod 122.

When the gearbox 110 is in a neutral gear, a hydraulic fluid is configured to pressurize the second neutral-gear passage 140 and the first neutral-gear passage 149. The hydraulic fluid forces the first piston 131 against the first-piston enclosure limiter 113 and the support rod 122. It also forces the second piston 132 against the second-piston enclosure limiter 114 and the support rod 122. When the gearbox 110 is in a first gear, the hydraulic fluid is configured to pressurize the first-gear passage 141 and the first neutral-gear passage 149. The hydraulic fluid forces the support rod 122 against the gearbox enclosure 112 either directly or through the first piston 131 and the second piston 132 against the second-piston enclosure limiter 114. When the gearbox 110 is in a second gear, the hydraulic fluid is configured to pressurize the second-gear passage 142 and the second neutral-gear passage 140. The hydraulic fluid forces the support rod 122 against the gearbox enclosure 112 either through the second piston 132 and the first piston 131 against the first-piston enclosure limiter 113.

In some examples, the electric vehicle drivetrain unit 100 further comprises a first neutral-gear valve 145, a second neutral-gear valve 148, a first-gear valve 146, and a second-gear valve 147. The first neutral-gear valve 145 fluidically couples the second neutral-gear passage 140 to the hydraulic pump 104 in one operating position and to the hydraulic tank 106 in another operating position. The second neutral-gear valve 148 fluidically couples the first neutral-gear passage 149 with the hydraulic pump 104 in one operating position and with the hydraulic tank 106 in another operating position. The first-gear valve 146 fluidically couples first-gear passage 141 with the hydraulic pump 104 in one operating position and with the hydraulic tank 106 in another operating position. The second-gear valve 147 fluidically couples the second-gear passage 142 with the hydraulic pump 104 in one operating position and with the hydraulic tank 106 in another operating position. The electric vehicle drivetrain unit 100 further comprises a drivetrain controller 102. The drivetrain controller 102 is communicatively coupled with and configured to actuate the first neutral-gear valve 145, the second neutral-gear valve 148, the first-gear valve 146, and the second-gear valve 147.

In some examples, the electric vehicle drivetrain unit 100 comprises a gear sensor 150. The drivetrain controller 102 is communicatively coupled with the gear sensor. As shown schematically in FIG. 1D, the gear sensor comprises a first-gear switch 157, a neutral-gear switch 156, and a second-gear switch 155. The shift-fork support 120 comprises a detent configured to activate the first-gear switch 157 when the gearbox 110 is in the first gear, activate the neutral-gear switch 156 when the gearbox 110 is in the neutral gear, and activate the second-gear switch 155 when the gearbox 110 is in the second gear. In some examples, the gear sensor 150 is configured to send a current gear input to the drivetrain controller 102, which represents the gear the gearbox 110 is in.

In some examples, the electric vehicle drivetrain unit 100 comprises an auxiliary unit output 193 coupled to the electric motor 108. The auxiliary unit output 193 is configured to rotate when the shaft of the electric motor 108 rotates. The auxiliary unit output 193 may rotate while the electric vehicle 190 is stationary if the gearbox 110 is in the neutral gear. In some examples, the auxiliary unit output 193 may power, for example, an air conditioning compressor. In some examples, the auxiliary unit output 193 may power a hydraulic pump. In some examples, the auxiliary unit output 193 may power an agricultural implement such as, for example, a sprayer. It may be desirable to operate these components from the auxiliary unit output 193 instead of from a separate electric motor. For example, in compact vehicles, fitting electric motors into the vehicle in addition to the drive motors may be a challenge.

In some examples, the electric vehicle drivetrain unit 100 comprises an additional electric motor 109, an additional gearbox 101, and an additional wheel 195. The additional electric motor 109 is communicatively coupled to the drivetrain controller 102. As shown schematically in FIG. 1C, the additional gearbox 101 is communicatively coupled to the drivetrain controller 102. The additional electric motor 109 is mechanically coupled to the additional gearbox 101. The additional wheel 195 is mechanically coupled to the additional gearbox 101. The additional gearbox 101 is fluidically coupled to the hydraulic pump 104 and the hydraulic tank 106 and comprises a first neutral-gear valve, a second neutral-gear valve, a first-gear valve, and a second-gear valve. In some examples, the drivetrain controller 102 is configured to operate the valves of the additional gearbox 101 in unison with the valves of the gearbox 110. In this example, the additional gearbox 101 will be operated in the same gear as the gearbox 110 (i.e. the neutral gear, the first gear, or the second gear). A difference in rotation speed between the wheel 192 and the additional wheel 195 may be controlled by a difference in rotation speed between the electric motor 108 and the additional electric motor 109. This may be desired, for example, to improve the traction of the electric vehicle 190 while turning. In another example, the drivetrain controller 102 is configured to operate the valves of the additional gearbox 101 separately from the valves of the gearbox 110. In this example, the difference in rotation speed between the wheel 192 and the additional wheel 195 may be controlled by both a difference in rotation speed between the electric motor 108 and the additional electric motor 109 and the difference between the gears the gearbox 110 and the additional gearbox 101 are in. For example, the gearbox 110 may be in the first gear and the additional gearbox 101 may be in the second gear. The rotation speed of the motor 108 and the additional motor 109 may then be adjusted to achieve the same rotational speed at the wheel 192 and the additional wheel 195 while maintaining a desired range of rotation speeds at the auxiliary unit output 193. In another example, the gearbox coupled to one wheel can be shifted into the neutral gear while the gearbox coupled to another wheel may be shifted to the first gear. This may be useful in averaging the power applied to the two wheels while maintaining the drive power of at least one of the wheels at all times. The gearbox 110 and the additional gearbox 101 may be shifted to different gears to optimize the traction of the wheels of the electric vehicle 190 when driving on, for example, uneven terrain or icy surfaces.

Examples of Methods of Shifting Gears in an Electric Vehicle

Figure 4:
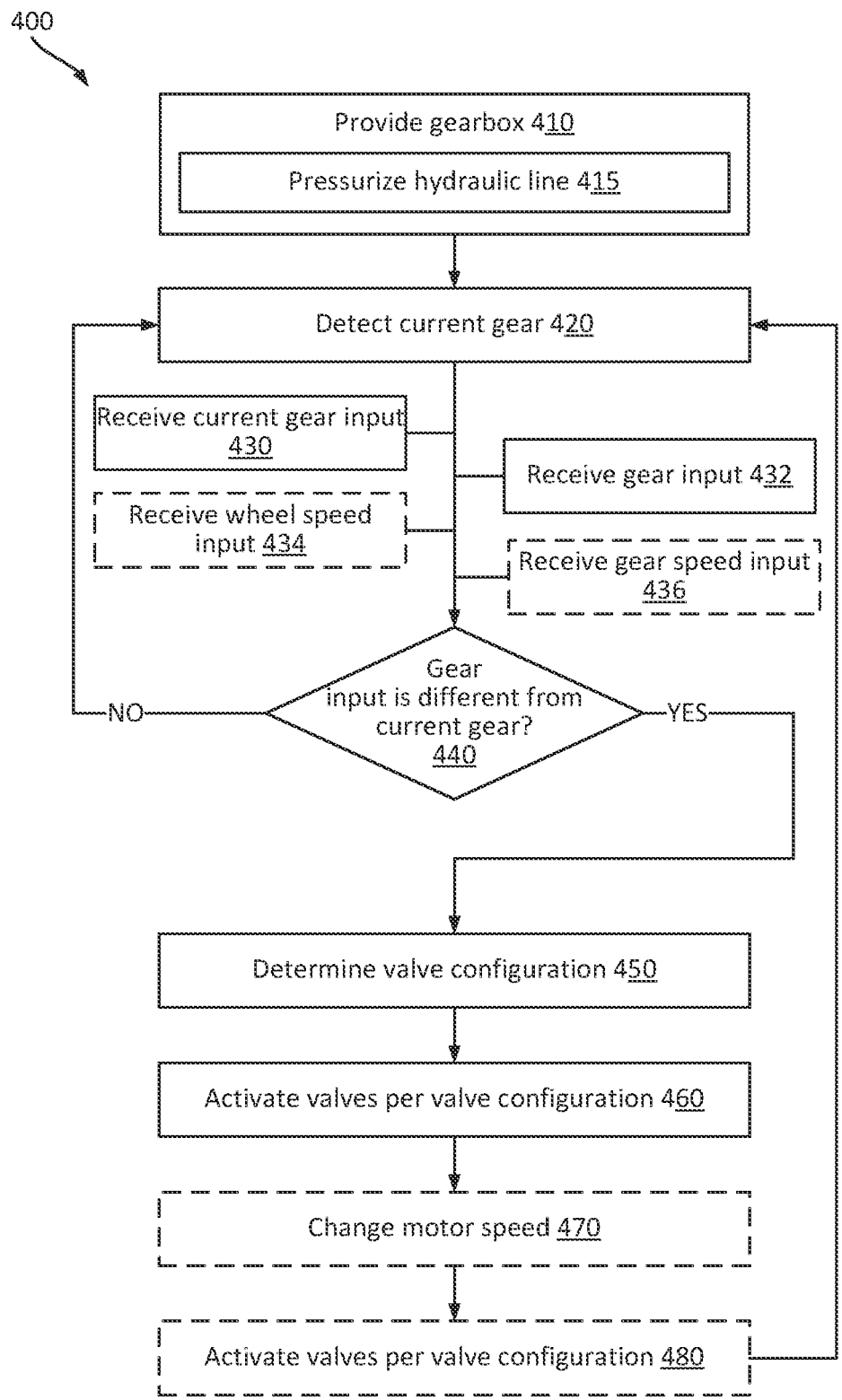
FIG. 4 is a process flowchart of a method for shifting gears in a gearbox of an electric vehicle, in accordance with some examples.

FIG. 4 is a process flowchart corresponding to method 400 of shifting gears in an electric vehicle 190 comprising a gearbox 110 and a drivetrain controller 102, in accordance with some examples. Method 400 may commence with (block 410) providing the gearbox 110 comprising a gear position sensor 150, a first neutral-gear valve 145, a second neutral-gear valve 148, a first-gear valve 146, a second-gear valve 147, a drivetrain controller 102, and a gearbox enclosure 112. The drivetrain controller 102 is communicatively coupled with the gear position sensor 150. The gearbox enclosure 112 comprises a first-piston enclosure limiter 113, a second-piston enclosure limiter 114, a second neutral-gear passage 140, a first neutral-gear passage 149, a first-gear passage 141, a second-gear passage 142, a support rod 122, a first piston 131, and a second piston 132. The support rod extends into the gearbox enclosure 112 and is fluidically coupled to at least the first-gear passage 141 and the second-gear passage 142. The first piston 131 is positioned between and slidably isolating the second neutral-gear passage 140 from at least the first portion of the support rod 122. The second piston 132 is positioned between and slidably isolating the first neutral-gear passage 149 from at least a second portion of the support rod. In some examples, (block 410) providing the gearbox 110 comprises (block 415) pressurizing hydraulic lines, upstream from the valves.

Method 400 may proceed with (block 420) detecting by the gear position sensor 150 a current gear input, (block 430) receiving at the drivetrain controller 102 the current gear input, and (block 432) receiving at the drivetrain controller 102 a gear input. The current gear input indicates the gear that the gearbox 110 is in. The gear input indicates the gear that the gearbox 110 will be after carrying out the shifting operation. The gear input may be provided, for example, by the drivetrain controller 102.

Method 400 may proceed with (block 440) comparing, using the drivetrain controller 102, the current gear input and the gear input and (block 450) determining by the drivetrain controller 102 a new valve configuration if the current gear input and the gear input are different. For example, if the current gear input is the neutral gear and the gear input is the first gear, the drivetrain controller 102 may determine a new valve configuration that would shift the gearbox 110 to the first gear.

Method 400 may proceed with (block 460) activating by the drivetrain controller 102 the first neutral-gear valve 145, the second neutral-gear valve 148, the first-gear valve 146, and the second-gear valve 147 such that the valves are configured to the new valve configuration if the current gear input and gear input are different. If the gear input was for the neutral gear, the new valve configuration would pressurize the second neutral-gear passage 140 and the first neutral-gear passage 149 forcing the first piston 131 against the first-piston enclosure limiter 113 and the support rod 122 and also forcing the second piston 132 against the second-piston enclosure limiter 114 and the support rod 122. If the gear input was for the first gear, the new valve configuration would pressurize the first-gear passage 141 and the first neutral-gear passage 149, forcing the support rod 122 against the gearbox enclosure 112 either directly or through the first piston 131 and the second piston 132 against the second-piston enclosure limiter 114. If the gear input was for the second gear, the new valve configuration would pressurize the second-gear passage 142 and the second neutral-gear passage 140 forcing the support rod 122 against the gearbox enclosure 112 through the second piston 132 and the first piston 131 against the first-piston enclosure limiter 113.

In some examples, the electric vehicle 190 further comprises a wheel speed sensor 158 and a motor speed sensor 159 communicatively connected with the drivetrain controller 102. The method may, after (block 430) receiving at the drivetrain controller 102 the current gear input, and (block 432) receiving at the drivetrain controller 102 a gear input, proceed with (block 434) receiving at the drivetrain controller 102 a wheel speed input from the wheel speed sensor 158, (block 436) receiving at the drivetrain controller 102 a motor speed input from the motor speed sensor 159, and determining at the drivetrain controller 102 a difference between the wheel speed input and the motor speed input, factoring in (a) the gear ratio between the wheel and the wheel-side dog-clutch half, (b) the gear ratio between the electric motor and the motor-side dog-clutch half, and (c) the gear ratio corresponding to the desired gear (to be switched in). In some examples, the rotational speeds of the two dog-clutch halves are measured and directly compared (without the need for the above factoring).

Specifically, the gearbox can reduce the motor speed to the wheel speed. For example, a first gear reduction can be 30-60 or, more specifically, 40-50, such as 43. The second gear reduction can be 10-25 or, more specifically, 12-20 such as 17. As such, in the first gear, the motor is spinning 43 times faster than the wheel. When shifting to neutral, the motor speed is slowed down by the factor of 43/17 (or now rotated 17 times faster than the wheel). Thereafter, the shift to the second gear is achieved with no clash. Overall, the rotational speeds of the dog clutch halves are substantially the same immediately prior to engaging (e.g., within 20%, within 10%, within 5%, or even within 1%). In the same or other examples, the rotational speed difference (immediately prior to engaging) is less than 150 RPM, less than 100 RPM, less than 60 RPM, or less than 40 RPM. It should be noted that a faster gear engagement time allows increasing this speed difference. For example, if there are 10 dog clutch teeth and the engagement time is within 100 ms, the speed difference can be 1 rev per second (or 60 revs per minute). The gearbox described above is specifically designed to reduce the gear engagement time thereby enabling faster and smoother shifting.

In some examples, the drivetrain controller 102 activates the first neutral-gear valve 145, the second neutral-gear valve 148, the first-gear valve 146, and the second-gear valve 147 in a valve configuration that shifts the gearbox 110 to the neutral gear before activating the valves in the new valve configuration. In these examples, the drivetrain controller 102 shifts the gearbox 110 from either the first gear or the second gear to the neutral gear before shifting the gearbox 110 to either the first gear or second gear. In some examples, (block 470) when the gearbox 110 is in the neutral gear, the drivetrain controller 102 instructs an electric motor to spin at a new speed. Specifically, the drivetrain controller 102 may instruct the electric motor to change speed if the difference between the wheel speed input and the motor speed input (based on various factors listed above or based on rotation speeds taken directly from the dog-halves) is greater than a first-speed difference limit. If the speed difference (factored or direct) is too large, shifting the gearbox 110 into either the first gear or the second gear may result in damage to the gears or negatively affect the drivability of the electric vehicle 190. When the speed difference (factored or direct) is within the first-speed difference limit (various examples of which are listed above), method 400 may then proceed with (block 480) activating by the drivetrain controller 102 the valves to the new valve configuration. In some examples, the drivetrain controller 102 activates the first neutral-gear valve 145, the second neutral-gear valve 148, the first-gear valve 146, and the second-gear valve 147 in a valve configuration such that the gearbox 110 is shifted from the first gear to the second gear or from the second gear to the first gear if the speed difference (factored or direct, as described above) is less than a second-speed difference limit, which may be the same or different from the first-speed difference limit. Various examples of speed difference limits are described above.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

The invention claimed is:

1. A gearbox for an electric vehicle drivetrain unit, the gearbox comprising:
   a gearbox enclosure comprising a first-piston enclosure limiter, a second-piston enclosure limiter, a second neutral-gear passage, a first neutral-gear passage, a first-gear passage, and a second-gear passage;
   a support rod extending into the gearbox enclosure and fluidically coupled to at least the first-gear passage and the second-gear passage;
   a first piston positioned between and slidably isolating the second neutral-gear passage from at least a first portion of the support rod; and
   a second piston positioned between and slidably isolating the first neutral-gear passage from at least a second portion of the support rod,
   a shift-fork support positioned on and connected to the support rod, wherein:
      when the gearbox is in a neutral gear, a hydraulic fluid is configured to pressurize the second neutral-gear passage and the first neutral-gear passage forcing the first piston against the first-piston enclosure limiter and the support rod and also forcing the second piston against the second-piston enclosure limiter and the support rod,
      when the gearbox is in a first gear, the hydraulic fluid is configured to pressurize the first-gear passage and the first neutral-gear passage, forcing the support rod against the gearbox enclosure either directly or through the first piston and the second piston against the second-piston enclosure limiter, and
      when the gearbox is in a second gear, the hydraulic fluid is configured to pressurize the second-gear passage and the second neutral-gear passage forcing the support rod against the gearbox enclosure through the second piston and the first piston against the first-piston enclosure limiter.

2. The gearbox of claim 1, wherein when the gearbox is in the first gear, the hydraulic fluid is configured to pressurize the first-gear passage forcing the support rod against the gearbox enclosure through the first piston.

3. The gearbox of claim 1, wherein when the gearbox is in the second gear, the hydraulic fluid is configured to pressurize the second-gear passage forcing the support rod against the gearbox enclosure through the second piston.

4. The gearbox of claim 1, wherein the shift-fork support is positioned between the first piston and the second piston.

5. The gearbox of claim 1, wherein the support rod extends between and partially protrudes into the first piston and the second piston.

6. The gearbox of claim 1, wherein:
   the support rod comprises a support rod shaft and a support rod piston, positioned at an end of the support rod shaft and having a larger diameter than the support rod shaft,
   the support rod piston is positioned between the first piston and the second piston and slidably coupled to the gearbox enclosure,
   the support rod shaft protrudes through the first piston and is connected to the shift-fork support, and
   the shift-fork support is positioned at an opposite end of the support rod from the support rod piston.

7. The gearbox of claim 1, wherein:
   the support rod comprises a support rod shaft and a support rod piston positioned at an end of the support rod shaft and having a larger diameter than the support rod shaft,
   the gearbox enclosure comprises a rod-piston enclosure limiter, and
   when the gearbox is in the first gear, the hydraulic fluid is configured to pressurize the first-gear passage forcing the support rod piston against the rod-piston enclosure limiter.

8. The gearbox of claim 1, wherein when the gearbox is in the first gear, the hydraulic fluid is configured to pressurize the first-gear passage forcing the support rod against the gearbox enclosure.

9. The gearbox of claim 1, wherein:
   the support rod further comprises a first-piston limit shoulder, and
   when the gearbox is in the neutral gear, the hydraulic fluid is configured to pressurize the first neutral-gear passage forcing the first piston against the first-piston limit shoulder.

10. The gearbox of claim 1, further comprising a hydraulic tank, a hydraulic pump, a first neutral-gear valve, a second neutral-gear valve, a first-gear valve, and a second-gear valve, wherein:
    the hydraulic pump is fluidically coupled to the hydraulic tank,
    the first neutral-gear valve fluidically couples the second neutral-gear passage to the hydraulic pump in one operating position and to the hydraulic tank in another operating position,
    the second neutral-gear valve fluidically couples the first neutral-gear passage with the hydraulic pump in one operating position and with the hydraulic tank in another operating position,
    the first-gear valve fluidically couples first-gear passage with the hydraulic pump in one operating position and with the hydraulic tank in another operating position, and
    the second-gear valve fluidically couples the second-gear passage with the hydraulic pump in one operating position and with the hydraulic tank in another operating position.

11. The gearbox of claim 1, wherein the gearbox further comprises a set of axial springs positioned on the support rod such that one spring of the set of axial springs is positioned between the shift-fork support and the first piston and one spring of the set of axial springs is positioned between the shift-fork support and the second piston.

12. The gearbox of claim 1, further comprising a gear sensor comprising a first-gear switch, a neutral-gear switch, and a second-gear switch, wherein:
    the first-gear switch, the neutral-gear switch, and the second-gear switch each physically contact the shift-fork support; and
    the shift-fork support comprises a detent configured to activate the first-gear switch when the gearbox is in a first gear, activate the neutral-gear switch when the gearbox is in a neutral gear, and activate the second-gear switch when the gearbox is in a second gear.

13. An electric vehicle drivetrain unit comprising:
an electric motor;
a hydraulic tank and a hydraulic pump;
a gearbox coupled to the motor;
a wheel coupled to the gearbox, wherein:
the gearbox comprises a gearbox enclosure and a support rod extending into the gearbox enclosure and fluidically coupled to a second neutral-gear passage, a first-gear passage, a second-gear passage, a first neutral-gear passage, a first-piston enclosure limiter, a second-piston enclosure limiter, a shift-fork support slidably coupled to the support rod, a first piston positioned between and slidably isolating first the neutral-gear passage from at least a first portion of the support rod, and a second piston positioned between and slidably isolating the first neutral-gear passage from at least a second portion of the support rod;
when the gearbox is in a neutral gear, a hydraulic fluid is configured to pressurize the second neutral-gear passage and the first neutral-gear passage forcing the first piston against the first-piston enclosure limiter and the support rod and also forcing the second piston against the second-piston enclosure limiter and the support rod;
when the gearbox is in a first gear, the hydraulic fluid is configured to pressurize the first-gear passage and the first neutral-gear passage, forcing the support rod against the gearbox enclosure either directly or through the first piston and the second piston against the second-piston enclosure limiter; and
when the gearbox is in a second gear, the hydraulic fluid is configured to pressurize the second-gear passage and the second neutral-gear passage forcing the support rod against the gearbox enclosure through the second piston and the first piston against the first-piston enclosure limiter.

14. The electric vehicle drivetrain unit of claim 13, further comprising an auxiliary unit output coupled to the electric motor configured to rotate when the electric motor rotates.

15. The electric vehicle drivetrain unit of claim 13, further comprising a drivetrain controller, an additional electric motor, an additional gearbox, and an additional wheel, wherein:
the additional electric motor is mechanically coupled to the additional gearbox, the additional wheel is mechanically coupled to the additional gearbox;
the additional electric motor and the additional gearbox are communicatively coupled to the drivetrain controller; and
the additional gearbox is fluidically coupled to the hydraulic pump and the hydraulic tank and comprises a first neutral-gear valve, a second neutral-gear valve, a first-gear valve, and a second-gear valve.

16. A method of shifting gears in an electric vehicle comprising a gearbox and a drivetrain controller, the method comprising:
providing the gearbox comprising a gear position sensor, a first neutral-gear valve, a second neutral-gear valve, a first-gear valve, a second-gear valve, a drivetrain controller communicatively connected with the gear position sensor and the valves, a gearbox enclosure comprising a first-piston enclosure limiter, a second-piston enclosure limiter, a second neutral-gear passage, a first neutral-gear passage, a first-gear passage, a second-gear passage, a support rod extending into the gearbox enclosure and fluidically coupled to at least the first-gear passage and the second-gear passage, a first piston positioned between and slidably isolating the second neutral-gear passage from at least a first portion of the support rod, and a second piston positioned between and slidably isolating the first neutral-gear passage from at least a second portion of the support rod comprising a first neutral-gear valve, a second neutral-gear valve, a first-gear valve, and a second-gear valve;
detecting by the gear position sensor a current gear input;
receiving at the drivetrain controller a current gear input;
receiving at the drivetrain controller a gear input;
comparing by the drivetrain controller the current gear input and the gear input;
determining by the drivetrain controller a new valve configuration if the current gear input and the gear input are different; and
activating by the drivetrain controller the first neutral-gear valve, the second neutral-gear valve, the first-gear valve, and the second-gear valve such that the valves are configured to the new valve configuration if the current gear input and gear input are different, wherein:
when the gearbox is in a neutral gear, a hydraulic fluid is configured to pressurize the second neutral-gear passage and the first neutral-gear passage forcing the first piston against the first-piston enclosure limiter and the support rod and also forcing the second piston against the second-piston enclosure limiter and the support rod,
when the gearbox is in a first gear, the hydraulic fluid is configured to pressurize the first-gear passage and the first neutral-gear passage, forcing the support rod against the gearbox enclosure either directly or through the first piston and the second piston against the second-piston enclosure limiter, and
when the gearbox is in a second gear, the hydraulic fluid is configured to pressurize the second-gear passage and the second first-neutral-gear passage forcing the support rod against the gearbox enclosure through the second piston and the first piston against the first-piston enclosure limiter.

17. The method of claim 16, wherein the electric vehicle further comprises a wheel speed sensor and a motor speed sensor communicatively connected with the drivetrain controller, further comprising:
receiving at the drivetrain controller a wheel speed input from the wheel speed sensor;
receiving at the drivetrain controller a motor speed input from the motor speed sensor; and
determining at the drivetrain controller a difference between the wheel speed input and the motor speed input.

18. The method of claim 17, wherein the drivetrain controller activates the first neutral-gear valve, the second neutral-gear valve, the first-gear valve, and the second-gear valve such that the valves are configured to the valve configuration such that the gearbox is shifted to the neutral gear and then activating the valves such that the valves are configured to the new valve configuration if the current gear input is the first gear and the gear input is the second gear or if the current gear input is the second gear and the gear input is the first gear.

19. The method of claim 18, wherein:
when the gearbox is in the neutral gear, the drivetrain controller instructs an electric motor to spin at a new speed if the difference between the wheel speed input and the motor speed input is greater than a first-speed difference limit; and activating, using the drivetrain controller, at least one of the first neutral-gear valve, the second neutral-gear valve, the first-gear valve, and the second-gear valve in accordance with a new valve configuration.

20. The method of claim 17, wherein the drivetrain controller activates the first neutral-gear valve, the second neutral-gear valve, the first-gear valve, and the second-gear valve such that the valves are configured to the valve configuration such that the gearbox is shifted from the first gear to the second gear or from the second gear to the first gear if the difference between the motor speed input and the wheel speed input is less than a second-speed difference limit.

\* \* \* \* \*